United States Patent Office 3,542,705
Patented Nov. 24, 1970

3,542,705
RECONSTITUTED LEATHERBOARD COMPRISING LEATHER FIBERS AND ALKYL-SUBSTITUTED NITRILE/CARBOXYL CONTAINING RUBBER
Colin P. Mason and Ernest G. Pole, Sarnia, Ontario, Canada, assignors to Polymer Corporation Limited, Sarnia, Ontario, Canada, a body corporate and body politic
No Drawing. Filed Nov. 3, 1967, Ser. No. 680,315
Claims priority, application Canada, Nov. 21, 1966, 975,948
Int. Cl. C08d 7/08
U.S. Cl. 260—8
8 Claims

ABSTRACT OF THE DISCLOSURE

A composition, suitable for use as leatherboard, comprises an admixture of leather fibres and a carboxyl-containing synthetic rubber comprising 50 or more percent of a conjugated alkadiene and 50 or less percent of an olefinically-unsaturated nitrile monomer characterized in that it has an alkyl-substituent containing 1 to 2 carbon atoms.

---

This invention relates to a process for making material composed of leather fibres in combination with synthetic rubber latex, and more particularly to leather-rubber sheet compositions prepared from aqueous dispersions of leather fibres and rubber.

Natural rubber latex has been successfully used in the manufacture of leather-rubber sheet material known generally as reconstituted leatherboard which has found utility in many shoe components. Many variations and improvements have been disclosed in this art, but the use of synthetic rubber latices has not found favour in this particular application for several reasons. Not only must the tensile strength of such a composition be of acceptable level but also the flex endurance must be of a high standard. It has hereto been a deficiency in this property of flex endurance which has prevented the available synthetic latices from use in leatherboard compositions.

Therefore, an object of the present invention, is to provide a process for making a composition of leather and synthetic rubber having flexibility and good adherence of the components. Another object is to provide a composite material of admixtures of finely comminuted leather fibres and synthetic rubber latex, the material having good mechanical strength and much improved endurance to flexing.

The invention is based upon the surprising discovery that the problem of using a synthetic latex to produce a leatherboard composition could be solved by employing a latex of carboxyl-containing polymer of an alkadiene and an alkyl-substituted acrylic nitrile monomer.

These and other objects are achieved in a composition comprising a mass of leather fibres adhered by means of a synthetic rubber deposited thereon in the amount of 5 to 25 parts by weight per 100 parts by weight of fibres plus rubber, said rubber being a carboxyl-containing copolymer comprising 50 to 90 percent by weight of a conjugated alkadiene having 4 to 8 carbon atoms and 10 to 50 percent by weight of an olefinically unsaturated nitrile monomer having an alkyl substituent containing 1 to 2 carbon atoms. In a specific embodiment of this invention there is provided a process for making a leather-rubber composition, which comprises the steps of forming an aqueous dispersion of leather fibres, admixing therewith a synthetic rubber latex, treating the mixture with a flocculating agent whereby the leather and rubber become coagulated into a slurry, separating the free liquid form said leather-rubber slurry, compressing, and drying; said rubber latex being an aqueous latex of a carboxyl-containing copolymer comprising 50 to 90 percent by weight of a conjugated alkadiene having 4 to 8 carbon atoms and 10 to 50 percent by weight of an olefinically unsaturated nitrile monomer having an alkyl-substituent containing 1 to 2 carbon atoms; the amount of rubber deposited on said fibres being 5 to 25 parts by weight per 100 parts by weight fibres plus rubber.

The rubber latex which is used in this invention is a latex of a carboxyl-containing polymer of 50 to 90 weight percent conjugated alkadiene having 4 to 8 carbon atoms and an olefinically unsaturated nitrile monomer having an alkyl-substituent of 1 to 2 carbon atoms. The alkadiene is an acyclic diolefin and includes butadiene-1,3, isoprene, and 2,3-dimethyl butadiene-1,3, of which butadiene is preferred. The alkyl-substituted, olefinically unsaturated nitrile monomer may contain 3 to 6 carbon atoms and is suitably an alkyl-substituted, acrylic nitrile copolymerizable with said alkadiene. Examples of such nitrile monomers are methacrylonitrile and ethacrylonitrile. Proportions of 10 to 50 weight percent nitrile monomer units in the copolymer are useful but the preferred range is 25 to 45 weight percent. The molecular weight of the copolymer may vary considerably but good results are obtained with polymers having a Mooney viscosity range (ML—4 at 100° C.) of 50 to 75. This nitrile polymer may be prepared by conventional polymerization of the monomers dispersed in an aqueous acidic solution containing a suitable emulsifier, an initiator, and a chain-transfer agent such as a mercaptan. An unsaturated carboxylic acid monomer, such as methacrylic acid or itaconic acid, usually in the amount of 1 to 5 weight percent per 100 parts total monomer is included in the monomer mixture to provide carboxy groups in the polymer. The resulting latex emulsion may then be made alkaline to a pH of 9–11. Although a nitrile rubber latex containing 20 to 25 percent total latex solids may be used there will normally be employed one containing 40 to 65 percent total latex solids. A proportion (usually of less than 20 percent) of another latex, such as natural latex or one of polyvinyl chloride or carboxylated acrylonitrile/isoprene polymer for example, may be used if desired in association with the nitrile rubber latex defined in this invention. Where desired, other methods of preparing carboxyl-containing polymers may be employed. Such methods include reacting a carboxyl-supplying agent such as maleic acid or thioglycollic acid or anhydride thereof with a non-carboxyl-containing alkadiene/nitrile copolymer.

The synthetic latex of a carboxyl-containing polymer of an alkadiene used in this invention is a modification of the latices known in the art and described in U.S. Patent 2,669,550 issued to H. P. Brown on Feb. 16, 1954. This patent describes various methods of preparing carboxylated latices and lists different butadiene-1,3 hydrocarbon monomers and olefinically unsaturated carboxylic acids that can be copolymerized in an aqueous emulsion.

Preparation of the leather slurry is a known art and the precise details will be dictated by such factors as the origin and condition of the leather. The process in general is as follows. After dry cutting and grinding the leather, usually scrap or sub-grade, tanned or untanned, the fibres are made into a dilute slurry with water. Good leatherboard is produced from a balance of long (i.e. about 3 mm.) and short fibres; cellulose fibres may be added in minor amounts to aid in flow and formation of an even web. Treating to remove tanning agents and excessive fine dust may be practised. A small quantity of oil may be worked into the leather fibres if desired to improve the flex and suppleness of the finished material. A slurry of up to 5 percent in water is prepared using a small proportion of wetting agent and a suitable stirrer.

The pH of the aqueous slurry is adjusted to about 7, then stabilized latex is slowly added with agitation and is dispersed uniformly in the leather slurry. The amount of latex used may vary but usually is such as to give from 5 to 25 parts by weight rubber per 100 parts fibre plus rubber, 15 to 20 parts being especially suitable for good grade finished material. Other additives such as filler, dye, or odorant may be incorporated. When thoroughly mixed, a coagulant such as aluminum sulphate in solution is added to precipitate the rubber latex onto the leather fibres. Good flocculation is indicated by a clear serum and by a free-flowing slurry. The slurry is then dewatered and filtered in moulds or fed to a Fourdrinier-type machine followed by pressing and drying to form the desired material, e.g. reconstituted leatherboard. The board may then be calendered to control thickness and improve appearance, and finally finished by embossing or lacquering. When carefully produced, the resulting product has a fine grained structure, free of visible clots of rubber, and compares favourably with high-grade leather as to resistance to cracking and scuffing. The product finds use for the manufacture in such articles as shoe components (e.g. insoles and outsoles), upholstery, luggage, and harness. The exact composition will, of course, be related to the use intended, and thus the rubber content may vary; the composition may include cellulosic or cork materials, and the composition may also include resin materials although the latter is limited by the degree of flexibility desired.

In addition to the excellent combined properties of tensile strength and flex endurance, the compositions prepared in accordance with this invention have the added feature of oil resistance (i.e. resistance to deterioration by hydrocarbons).

The physical tests used in the examples herein were those as issued by The British Boot, Shoe and Allied Trades Research Association, SATRA House, England, bearing date August 1959, coded PM/FB2 and PM/FB3, and entitled "Tensile Strength Test for Fibre Boards" and "Flexing Endurance Test for Fibre Boards," respectively. The tensile strengths reported herein are those for "dry" specimens only. It is noted that the flexing endurance test is a severe one since the specimen is flexed 90° each side of the vertical. We have found but few synthetic latices which, when used as a component in leatherboard, will endure 1000 flex cycles. It is desirable to have leatherboard withstand at least 2500 cycles, and for top quality commercial leatherboard a flex endurance in excess of 5000 cycles is sought.

The following examples serve to illustrate the invention disclosed and claimed herein:

EXAMPLE I

A nitrile rubber latex was prepared by emulsion polymerization using 45/52/3 monomer ratio of methacrylonitrile/butadiene-1,3/methacrylic acid, using 3 parts alkyl aryl sulphonate emulsifier and 2 parts alkyl aryl polyether sulphonate emulsifier and 0.03 part potassium persulphate as catalyst per 100 total parts by weight monomer. The polymerization was conducted at 40° C. and carried to 95 percent conversion.

The resulting nitrile rubber latex had a total solids content of 45 percent, and after unreacted monomers were removed by vacuum distillation, the pH of the latex was adjusted to 9.0 by the addition of concentrated ammonia solution.

Shredded but unrefined scrap leather fibre was dispersed in water in the ratio of 40 grams of leather to 1960 grams of water, and the pH of the system was adjusted to 7 with ammonium hydroxide. After the leather fibres were thoroughly wetted, there was added sufficient of the nitrile rubber latex (diluted 1/1 with water) to give a deposit of 20 parts of rubber per 100 parts by weight total leather plus rubber, and the mixture kept under agitation for a further two minutes. Flocculation was then brought about by reducing the pH to 4 with freshly prepared 20 percent aqueous alum solution, and agitation continued for a further five minutes. The flocculated leather-rubber slurry was then poured into a suction filter where the liquid serum was removed to leave a filter cake measuring 21.5 centimeters in diameter. The leather-rubber filter cake was then placed between two sheets of canvas held apart by thickness spacers of 0.2 centimeter thickness, and placed in a cold press. The resulting compacted sheet was then dried overnight in an oven at 52° C., yielding a leatherboard of attractive appearance and feel to the hand. The leatherboard was conditioned at 24° C. and a relative humidity of 45 percent before testing.

Similar compositions were prepared for comparison using synthetic latices not of this invention. Two of these latices were a carboxylated latex of an SBR copolymer of styrene/butadiene/acrylic acid of 48/50/2 monomer ratio. The other was a carboxylated latex of an NBR copolymer of acrylonitrile/butadiene/methacrylic acid of 40/58/2 monomer ratio.

All leatherboard sheets prepared were then tested for tensile strength and flex endurance by the hereinbefore ferred SATRA test methods. The results for the carboxylated SBR and carboxylated NBR composites are given in Table I together with the test values for the composition of this invention. These show that although reasonable tensile strength can be obtained in compositions containing conventional latices, they lack the necessary flex endurance. By contrast, greatly increased flex endurance values were observed for the alkyl-substituted acrylic nitrile latext composition while a satisfactory tensile strength was retained.

TABLE I

| Type of latex employed in composition | Tensile strength (dry) kg./cm.$^2$ | Flex endurance number of cycles |
|---|---|---|
| Latex of this invention, (carboxylated methacrylonitrile/butadiene polymer) | 105 | 7,000 |
| Other reference latices: | | |
| (a) (carboxylated styrene/butadiene polymer) | 94.5 | 60 |
| (b) (carboxylated acrylonitrile/butadiene polymer) | 89.3 | 550 |

EXAMPLE II

Leatherboard compositions were prepared as in Example I but using latices having a range of methacrylonitrile contents and methacrylic acid contents. Compositions II(a) to II(f) inclusive contained 20 percent rubber while II(g) contained 10 percent. Tests for tensile strength and flex endurance were again performed, and the results are shown in Table II.

TABLE II

| Run Number | Methacrylonitrile content of rubber in latex, percent | Methacrylic acid content of rubber in latex, percent | Tensile strength, kg./cm.$^2$ | Flex endurance No. of cycles |
|---|---|---|---|---|
| II-(a) | 40 | 3 | 94 | 6,288 |
| II-(b) | 42.5 | 3 | 106 | 6,857 |
| II-(c) | 45 | 3 | 106 | 6,902 |
| II-(d) | 47.5 | 3 | 112 | 5,422 |
| II-(e) | 45 | 1 | 94 | 7,176 |
| II-(f) | 45 | 5 | 118 | 4,499 |
| II-(g) | 45 | 1 | 87 | 3,384 |

What is claimed is:

1. A reconstituted leatherboard, having improved flex endurance comprising leather fibres in admixture with a synthetic rubber in the ratio of 5 to 25 parts by weight of said rubber per 100 parts by weight of said fibres plus rubber, said rubber consisting essentially of a carboxyl-containing copolymer comprising 50 to 90 percent by weight of an acyclic conjugated alkadiene having 4 to 8 carbon atoms, and 10 to 50 percent by weight of an olefinically-unsaturated nitrile monomer selected from the group consisting of methacrylonitrile and ethacrylonitrile and 1-5 percent by weight of an olefinically-unsaturated carboxylic acid monomer, the amounts of said carboxyl, alkadiene, and nitrile moieties being based on a total of 100 parts of said copolymer.

2. The composition of claim 1 wherein the alkadiene is butadiene-1,3.

3. The composition of claim 2 wherein the nitrile is methacrylonitrile.

4. The composition of claim 3 wherein the copolymer comprises 25 to 45 weight percent methacrylonitrile.

5. The composition of claim 4 wherein the copolymer is a copolymer of butadiene, methacrylonitrile and an unsaturated carboxylic acid monomer selected from methacrylic acid and itaconic acid, said copolymer containing 25–45 weight percent of methacrylonitrile and 1–5 weight percent of the carboxylic acid monomer, the remainder being butadiene units.

6. In a process for making a reconstituted leatherboard having improved flex endurance which comprises treating an admixture of an aqueous dispersion of leather fibres with a synthetic rubber latex with a flocculating agent whereby said latex coagulates and deposits on said fibres to form a slurry of leather fibres having rubber from said latex deposited thereon, separating, compressing and drying said rubber-containing leather fibres to form said reconstituted leatherboard, the use of a rubber latex consisting substantially of an aqueous latex of a carboxyl-containing copolymer comprising 50–90 percent by weight of an acyclic conjugated alkadiene having 4–8 carbon atoms, 10–50 percent by weight of an olefinically-unsaturated nitrile monomer selected from the group consisting of methacrylonitrile and ethacrylonitrile and 1–5 percent by weight of an olefinically-unsaturated carboxylic acid monomer, the amounts of said carboxyl, alkadiene, and nitrile moieties being based on a total of 100 parts of said copolymer.

7. The process according to claim 6 in which said carboxyl-containing copolymer is a copolymer of butadiene, methacrylonitrile and an unsaturated carboxylic acid monomer selected from methacrylic acid and itaconic acid, said copolymer containing 25–45 weight percent of methacrylonitrile and 1–5 weight percent of the carboxylic acid monomer, the remainder being butadiene units.

8. The process according to claim 7 wherein the synthetic rubber latex is admixed in a proportion sufficient to deposit on said leather fibres 5–25 parts by weight of said rubber per 100 parts of fibres plus rubber.

References Cited

UNITED STATES PATENTS

| 2,772,970 | 12/1956 | Feigley | 260—8 |
| 2,858,283 | 10/1958 | Garrett | 260—8 |
| 3,335,827 | 8/1967 | Hofferbert | 260—80.7 |
| 3,392,048 | 7/1968 | Rolik | 260—80.7 |
| 3,403,136 | 9/1968 | Baker | 260—80.7 |
| 3,426,102 | 2/1969 | Solak et al. | 260—80.7 |

OTHER REFERENCES

Chem, Abst. 52: 3409h, "Artificial Leather," (Guerra).

Chem. Abst. 65: 17223a, "Utilization of Waste Pieces etc.," (Dayne).

Chem. Abst. 52: 19260g, "Leather Substitute" (Nauchno).

Chem. Abst. 66: 96254v, "Leatherboard" (Clark et al.).

WILLIAM H. SHORT, Primary Examiner

EDWARD WOODBERRY, Assistant Examiner

U.S. Cl. X.R.

260—80.7